(No Model.)

F. L. SNOW.
CARRIAGE AXLE BOX.

No. 307,500. Patented Nov. 4, 1884.

Witnesses.
S. N. Piper
E. B. Pratt.

Inventor.
Frank L. Snow.
by R. H. Eddy atty.

United States Patent Office.

FRANK L. SNOW, OF WEST SWANZEY, NEW HAMPSHIRE.

CARRIAGE-AXLE BOX.

SPECIFICATION forming part of Letters Patent No. 307,500, dated November 4, 1884.

Application filed July 31, 1884. (No model.)

*To all whom it may concern:*

Be it known that I, FRANK L. SNOW, of West Swanzey, in the county of Cheshire, of the State of New Hampshire, have invented a new and useful Improvement in Carriage-Wheel Boxes; and I do hereby declare the same to be described in the following specification and represented in the accompanying drawings, of which—

Figure 1:
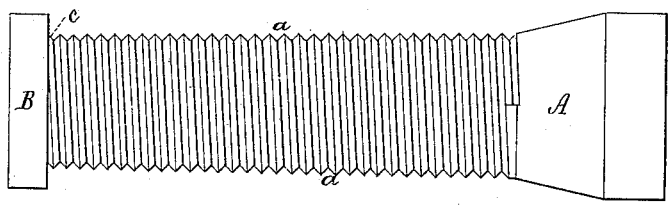
Figure 2:
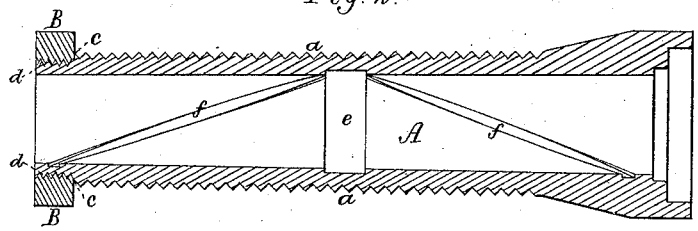

Figure 1 is a side elevation, and Fig. 2 a longitudinal section, of a wheel-box provided with my invention, the nature of which is defined in the claims hereinafter presented.

The box is made of metal—preferably of what is termed "Babbitt metal"—and of the usual form, as represented, except that it is screw-threaded on its exterior surface to enable it to be screwed into the hub of a wheel. It also has at its lesser or outer end another or short screw, and a shoulder at the base thereof, the thread of the latter screw being the reversed way of that of the larger screw. On the lesser screw, and up to the shoulder, a ring is screwed, and is to be embedded in the wheel-hub.

I usually form within and around the bore of the box, at the middle thereof, an oil-chamber or shallow groove, and from such, both at top and at bottom, I extend in opposite directions through the bore and obliquely to the axis thereof two grooves, all being as represented in the drawings, in which—

A is the box, $a$ the external screw-thread, $c$ the shoulder, $d$ the the lesser or end screw, and B the ring to screw on the latter. The median oil-groove is shown at $e$, and one pair of its oblique grooves at $f f$. These grooves, when the box is in use, hold oil, and cause it to lubricate the entire surface of the axle-journal when the box may be in revolution on it.

By having the box screw-threaded to screw into the wheel-hub and provided with the shoulder and auxiliary screw, and the ring to screw on the latter, the box, when in the hub, becomes firmly held therein and cannot turn out of it or work loose in it so long as the ring is in place, whether the wheel may be revolving one way or the opposite.

I do not claim an axle-box tapering and screw-threaded on its outer surface from its outer end to or near its inner end, or one so made and projected from a hub and provided with a screw-nut, as set forth in the United States Patent No. 255,077, my axle-box having additional features—viz., a reversed screw, a shoulder, and a ring, such ring being screwed upon such reversed screw and up to the shoulder and extended into the wheel-hub, whereby important advantages are gained; nor do I claim an axle-journal provided with a central depression extending partially around it, and also having two spiral grooves extending therefrom, as represented in the United States Patent No. 184,344; nor do I claim an axle-box having in its bore a series of spiral grooves arranged as represented in the United States Patent No. 40,431, such grooves operating to force the oil in one direction only. With my improvement there is no weakening, as is the case when it is provided with grooves, and by having the median groove or oil chamber $e$ extending entirely around the bore, as it does in my axle-box, it can be made to hold more oil and to distribute it to better advantage upon the journal.

I claim—

1. The wheel-box screw-threaded on its outer surface and provided with the shoulder and auxiliary reverse-threaded screw, and the ring to screw upon the latter, all being substantially as set forth.

2. The wheel-box having within and extending around its bore the transverse oil chamber or groove, and leading therefrom to the ends of such bore the oblique grooves, all being substantially as represented.

FRANK L. SNOW.

Witnesses:
AMOS J. BLAKE,
R. H. PORTER.